(12) United States Patent
Gong et al.

(10) Patent No.: US 7,769,002 B2
(45) Date of Patent: Aug. 3, 2010

(54) CONSTRAINED DYNAMIC PATH SELECTION AMONG MULTIPLE COMMUNICATION INTERFACES

(75) Inventors: Xiaohong Gong, Sunnyvale, CA (US); Anand Rangarajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 12/032,604

(22) Filed: Feb. 15, 2008

(65) Prior Publication Data

US 2009/0207736 A1 Aug. 20, 2009

(51) Int. Cl.
*H04Q 11/00* (2006.01)
(52) U.S. Cl. ............... 370/359; 370/229; 370/230; 370/252; 370/419
(58) Field of Classification Search .......... 370/229, 370/230, 230.1, 231–235, 252, 359, 413, 370/419
See application file for complete search history.

(56) References Cited

U.S. PATENT DOCUMENTS

| | | | | |
|---|---|---|---|---|
| 6,917,812 | B2 * | 7/2005 | Damnjanovic | 455/452.2 |
| 7,492,720 | B2 * | 2/2009 | Pruthi et al. | 370/252 |
| 7,599,293 | B1 * | 10/2009 | Bain et al. | 370/235 |
| 2003/0126280 | A1 * | 7/2003 | Yao et al. | 709/234 |
| 2007/0030826 | A1 * | 2/2007 | Zhang et al. | 370/331 |
| 2009/0175172 | A1 * | 7/2009 | Prytz et al. | 370/238 |

FOREIGN PATENT DOCUMENTS

| | | |
|---|---|---|
| WO | 2006104728 A2 | 10/2006 |
| WO | 2009102553 A1 | 8/2009 |

OTHER PUBLICATIONS

International Search Report and Written Opinion for PCT Patent Application No. PCT/US2009/032191, Mailed on Jun. 29, 2009, pp. 11.
Devi, S. et al. "Dynamic Interface Selection in Portable Multi-Interface Terminals", IEEE International Conference on Portable Information Devices, May 2007, pp. 1-5.

* cited by examiner

*Primary Examiner*—Kwang B Yao
*Assistant Examiner*—Nguyen Ngo
(74) *Attorney, Agent, or Firm*—Grossman, Tucker, Perreault & Pfleger, PLLC

(57) ABSTRACT

Method and apparatus are disclosed for constrained dynamic path selection among multiple available communication interfaces. In some embodiments selection logic is operatively coupled with a number of link-layer interfaces to select a set of link-layer interfaces that satisfy a set of congestion constraint conditions. Metric logic is operatively coupled with the link-layer interfaces to calculate a metric value for each link-layer interface in the set. Switch logic is operatively coupled with the selection logic and metric logic to assign a data stream a link-layer interface in the set of interfaces according to its metric value to optimize communication performance.

23 Claims, 8 Drawing Sheets

CONSTRAINED DYNAMIC PATH SELECTION AMONG MULTIPLE COMMUNICATION INTERFACES

CROSS-REFERENCE TO RELATED APPLICATIONS

This disclosure is related to U.S. patent application Ser. No. 11/030,593, titled "Multichannel, mesh router and methods for path selection in a multichannel mesh network," filed Jan. 4, 2005.

FIELD OF THE DISCLOSURE

This disclosure relates generally to the field of network communications. In particular, the disclosure relates to constrained dynamic path selection among multiple available communication interfaces.

BACKGROUND OF THE DISCLOSURE

In modern computing devices such as Laptops, Ultra-Mobile PCs (UMPCs), and Mobile Internet Devices (MIDs) there may exist multiple network interfaces such as Ethernet, Wi-Fi, Bluetooth, WiMAX, and/or 3G (third generation wireless for mobile phones). Current operating systems don't use multiple interfaces for communication with devices on the available networks. They default to using one interface when multiple interfaces of a single machine are connected to the same network.

The Open Systems Interconnection (OSI) model and the TCP/IP or Internet reference model for network protocol stacks provide layered abstract descriptions for communications, with upper layers including an application layer and a transport layer and lower layers including a network layer, a data link layer and a physical layer.

The data link layer provides for transfer of data between network entities and detects/corrects errors that may occur in the physical layer. Originally intended for point-to-point and point-to-multipoint media of the telephone system wide area networks (WANs), the data link layer in local area network (LAN) architectures, which include broadcast-capable multi-access media (e.g. as in IEEE Project 802) provide for sub-layering and management functions not originally required for WAN use. In practice though, flow control is not present in modern data link protocols such as the Point-to-Point Protocol (PPP), and the Logic Link Control (LLC) of IEEE 802.2 is not used for most protocols on Ethernets or other LANs. Thus, potential benefits of flow control in the data link layer have not been fully explored.

DESCRIPTION OF THE DRAWINGS

The present invention is illustrated by way of example and not limitation in the figures of the accompanying drawings.

DETAILED DESCRIPTION

Methods and apparatus are disclosed for constrained dynamic path selection among multiple available communication interfaces. In some embodiments selection logic is operatively coupled with a number of link-layer interfaces to select a set of link-layer interfaces that satisfy a set of congestion constraint conditions. Metric logic is operatively coupled with the link-layer interfaces to calculate a metric value for each link-layer interface in the set. Switch logic is operatively coupled with the selection logic and metric logic to assign a data stream a link-layer interface in the set of interfaces according to its metric value to optimize communication performance.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Since devices such as Laptops, Ultra-Mobile PCs (UMPCs), and Mobile Internet Devices (MIDs) may include multiple network interfaces such as Ethernet, Wi-Fi, Bluetooth, WiMAX, and/or 3G, in many scenarios, it would be beneficial to use these multiple interfaces simultaneously (for better aggregate bandwidth, selective use for power efficiency, etc.) to communicate between such devices. An example of such a scenario is a peer-to-peer network with a MID and a Laptop both equipped with Wi-Fi and Bluetooth interfaces.

Hybrid networking is a new architecture that provides devices the ability to use multiple interfaces in the data-link layer simultaneously for communication with other devices on the network. For some embodiments described below an algorithm that can be used by a path selection component of hybrid networking to dynamically choose an interface for communication with a destination on the local network based on a cost function that optimizes both energy consumption and throughput. Moreover, it can also detect and dynamically alter the interface upon detection of congestion in interfaces such as Wi-Fi that employ contention-based network access.

Figure 1:
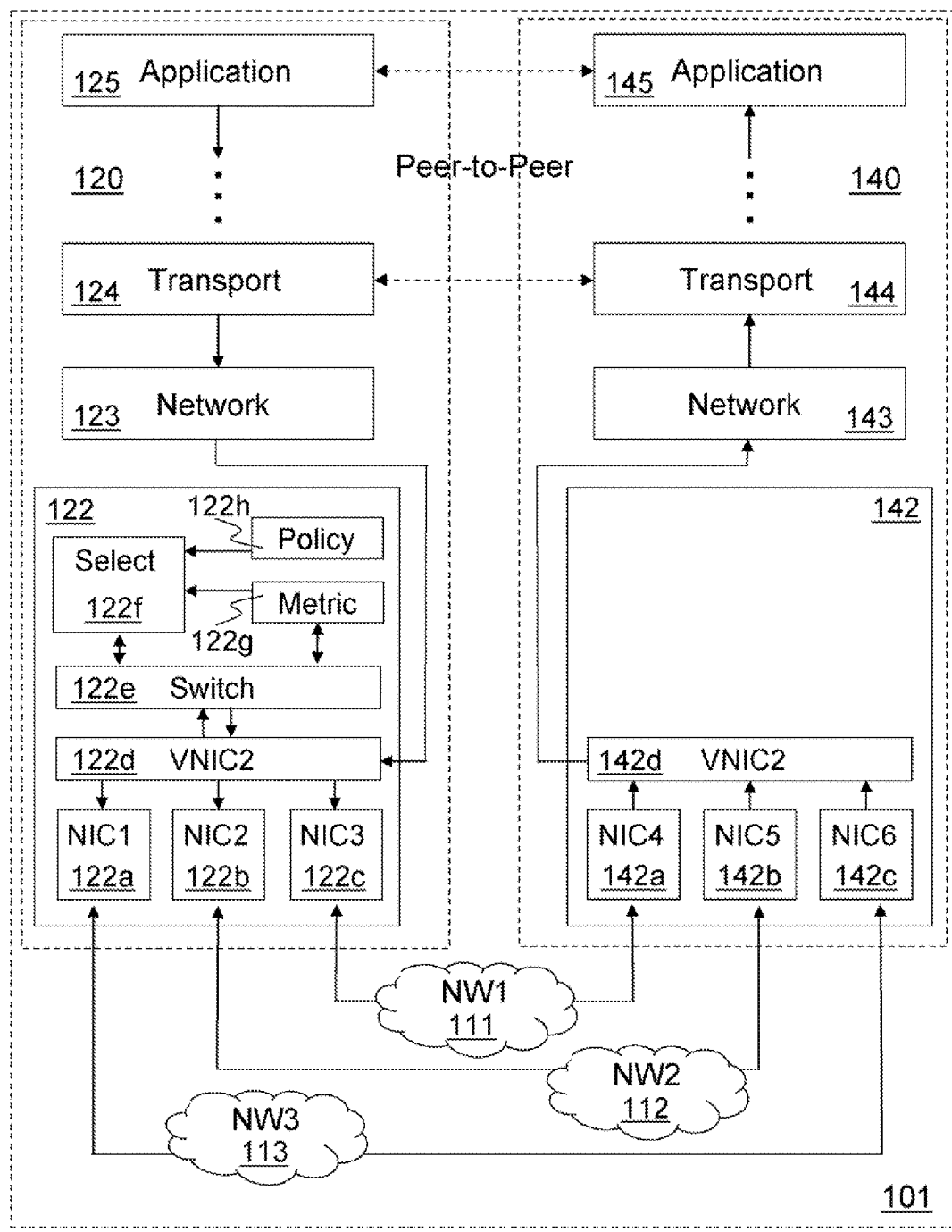
FIG. 1 illustrates one embodiment of a networked system employing constrained dynamic path selection among multiple network communication interfaces.

FIG. 1 illustrates one embodiment of a networked system 101 employing constrained dynamic path selection among multiple network communication interfaces. networked system 101 network device 120 and network device 140. Network device 120 and network device 140 may establish peer-to-peer communications, for example, between application layer 125 and application layer 145 or between transport layer 124 and transport layer 144. Such communications may be routed from network layer 123 to network layer 143 across any of the physical networks 111-113.

Network device 120 includes a path selection component 122 for employing constrained dynamic path selection among multiple network communication interfaces. Network layer 123 communicates with a virtual network interface card (VNIC) 122d of component 122. Network device 120 includes selection logic 122f operatively coupled with link-layer interfaces 122a-122c. Selection logic 122f selects a set of link-layer interfaces that satisfy a set of congestion constraint conditions. Network device 120 also includes metric logic 122g operatively coupled with the link-layer interfaces 122a-122c to calculate a metric value for each link-layer interface in the set of link-layer interfaces selected by selection logic 122f. Some embodiments of network device 120 may also include policy logic 122h operatively coupled with metric logic 122g to adjust how metric logic 122g calculates metric values for a given data stream to optimize communication performance. Network device 120 also includes switch logic 122e operatively coupled with selection logic 122f and with metric logic 122g to assign a data stream one of the link-layer interfaces 122a-122c in the set of link-layer interfaces selected by selection logic 122f according to its corresponding metric value calculated by metric logic 122g to optimize communication performance. Responsive to switch logic 122e, packets of a data stream received by VNIC 122d are switched to one of the link-layer interfaces 122a-122c assigned to that data stream by switch logic 122e.

Network device 140 includes a number of link-layer interfaces 142a-142c. One of the link-layer interfaces 142a-142c is operatively coupled with the link-layer interface assigned to the data stream by switch logic 122e via one of the physical networks 111-113 to facilitate a transfer of data between network device 120 and network device 140 over the network. Network device 140 also includes a VNIC 142d to receive the data transfers from link-layer interfaces 142a-142c and to communicate them to network layer 143.

It will be appreciated that a path selection component 122 for employing constrained dynamic path selection may dynamically choose an interface for communication with a destination on a local network based on a metric that optimizes both energy consumption and throughput. As network traffic changes, it can detect congestion in interfaces and dynamically alter the interfaces assigned to data streams.

Figure 2:
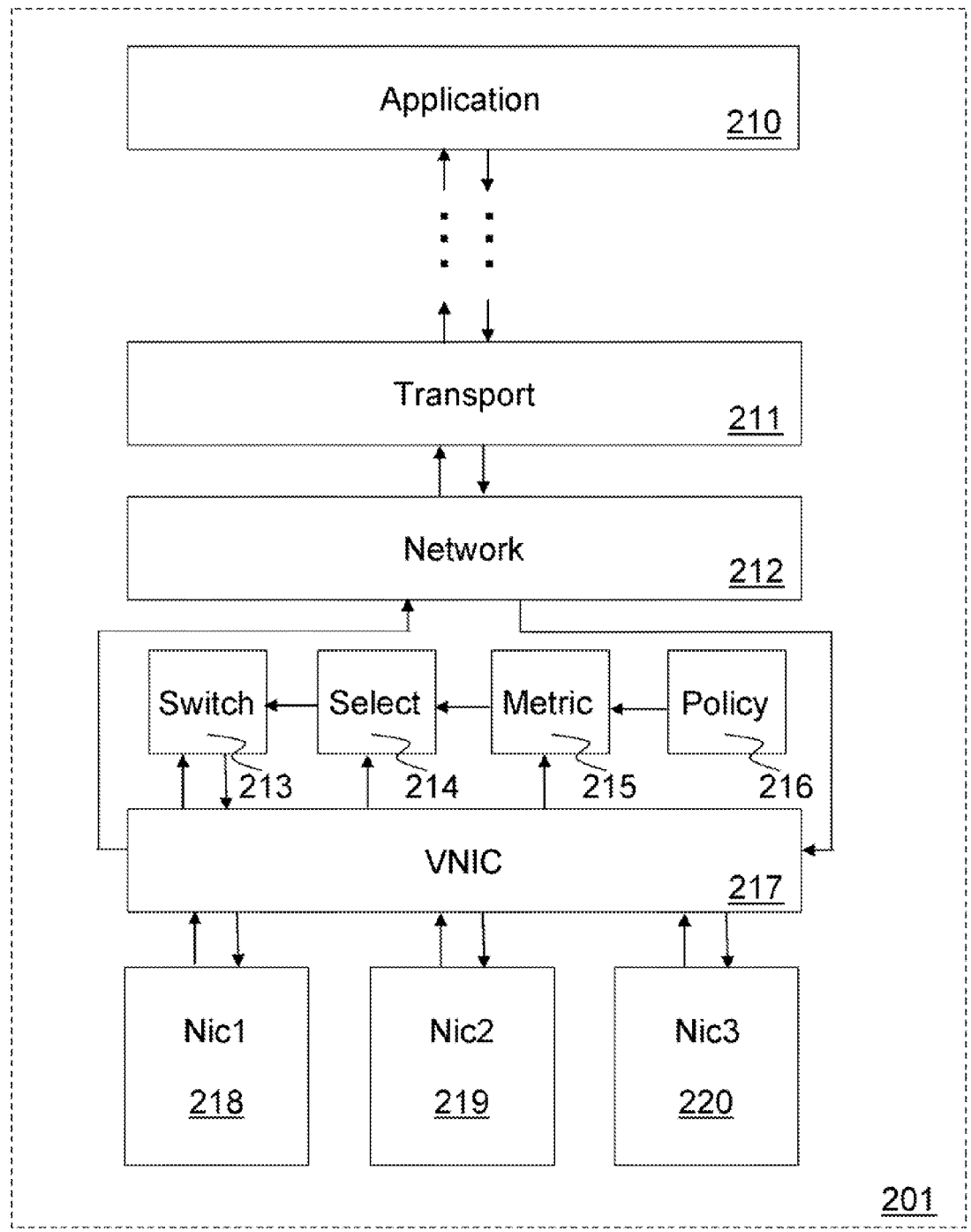
FIG. 2 illustrates one embodiment of a network device to facilitate constrained dynamic path selection among multiple network communication interfaces.

FIG. 2 illustrates one embodiment of a network device 201 to facilitate constrained dynamic path selection among multiple network communication interfaces. Network device 201 includes application layer 210, transport layer 211 and network layer 212. Network layer 212 communicates with a VNIC 217. Network device 201 includes selection logic 214 operatively coupled with link-layer interfaces 218-220. Selection logic 214 selects a set of link-layer interfaces that satisfy a set of congestion constraint conditions. Network device 201 also includes metric logic 215 operatively coupled with the link-layer interfaces 218-220 to calculate a metric value for each link-layer interface in the set selected by selection logic 214. Some embodiments of network device 201 may also include policy logic operatively coupled with metric logic 215 to adjust how metric logic 215 calculates metric values for a given data stream to optimize communication performance. Network device 201 also includes switch logic 213 operatively coupled with selection logic 214 and with metric logic 215 to assign a data stream one of the link-layer interfaces 218-220 in the set of link-layer interfaces selected by selection logic 214 according to its corresponding metric value calculated by metric logic 215 to optimize communication performance. Responsive to switch logic 213, packets of a data stream received by VNIC 217 are switched to one of the link-layer interfaces 218-220 assigned to that data stream by switch logic 213. VNIC 217 also receives any data transfers from link-layer interfaces 218 and communicates them to network layer 212.

Processes employed in some embodiments of the path selection components of the hybrid networking architecture are described in greater detail below.

Figure 3A:
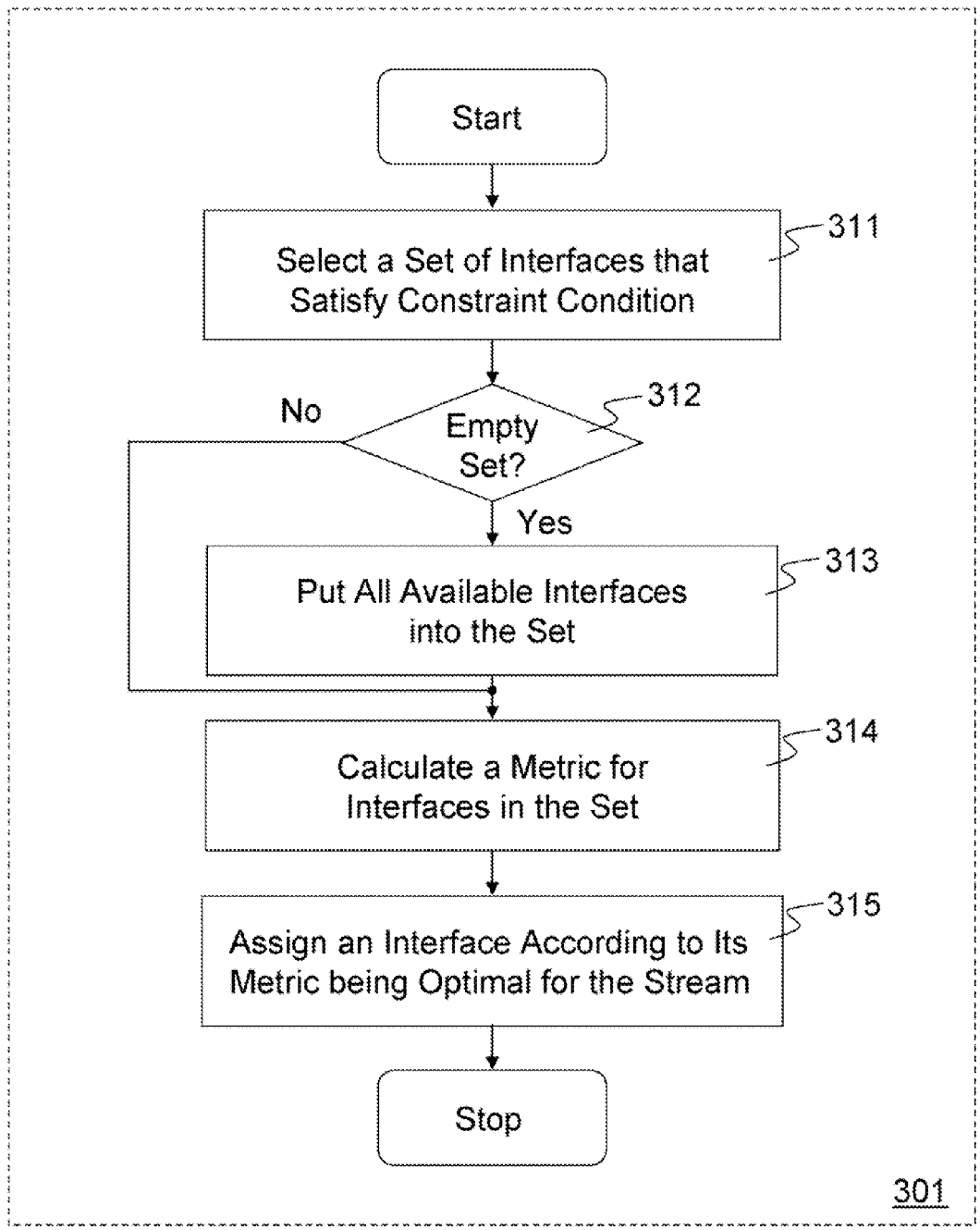
FIG. 3*a* illustrates a flow diagram for one embodiment of a process to perform constrained dynamic path selection among multiple network communication interfaces.

FIG. 3a illustrates a flow diagram for one embodiment of a process 301 to perform constrained dynamic path selection among multiple network communication interfaces. Process 301 and other processes herein disclosed are performed by processing blocks that may comprise dedicated hardware or software or firmware operation codes executable by general purpose machines or by special purpose machines or by a combination of both.

In processing block 311a set of link-layer interfaces is selected that satisfy some constraint condition(s). For some embodiments of process 301a set of congestion constraint conditions for a number of link-layer interfaces may be employed, such as having a number of available empty positions in their queues, for example. In processing block 312 the set may be checked to see if no link-layer interfaces were selected in processing block 311. If so all available interfaces are put into the set in processing block 313. In processing block 314 a metric value for each link-layer interface in the set of link-layer interfaces is calculated. Then in processing block 315 a link-layer interface in the set is assigned according to its corresponding metric value to optimize communication performance for the data stream.

Processes performed by processing blocks for some embodiments of process 301 are described in greater detail below.

Figure 3B:
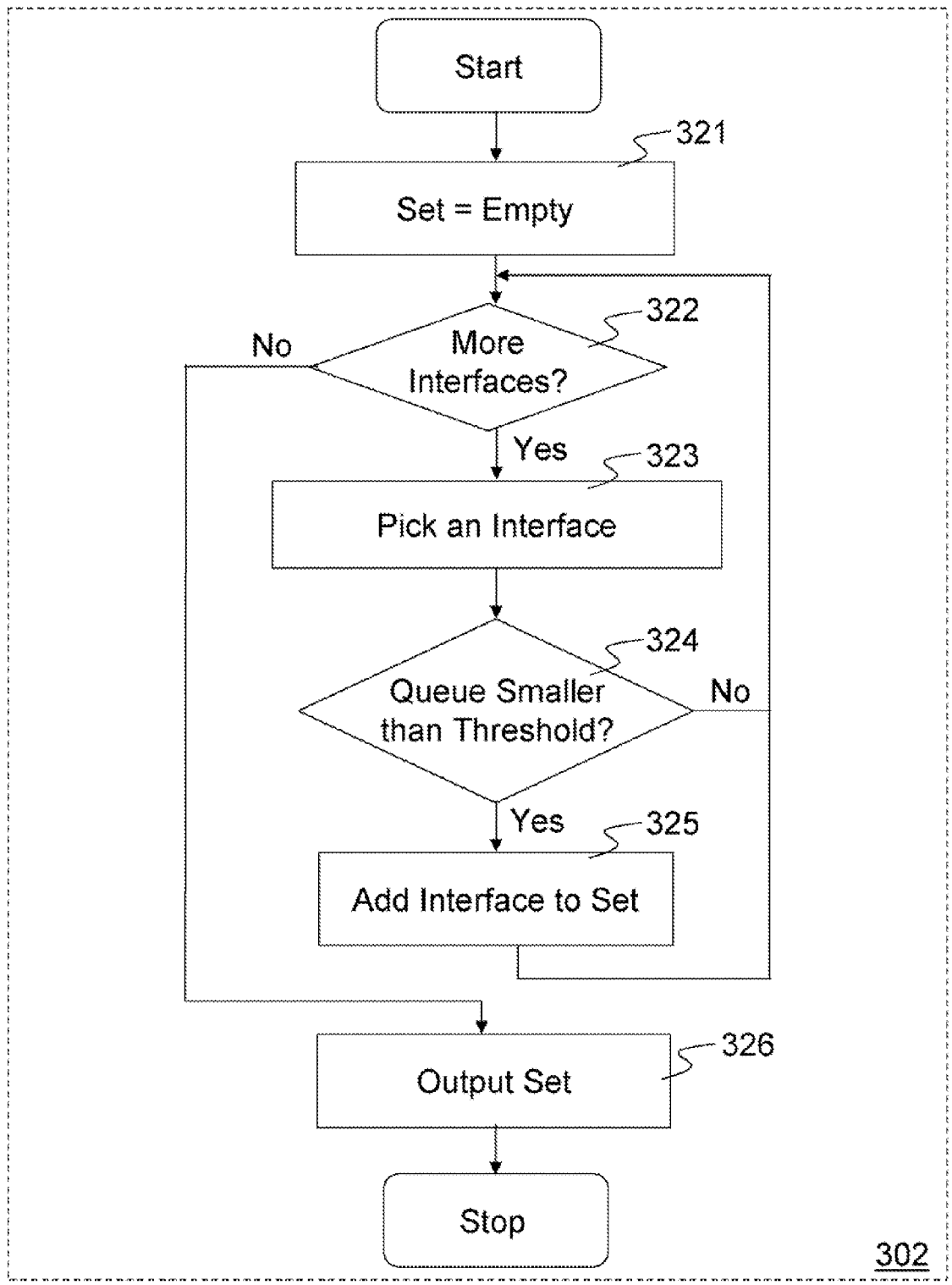
FIG. 3*b* illustrates a flow diagram for one embodiment of a process to select a set of link-layer interfaces that satisfy a set of congestion constraint conditions.

FIG. 3b illustrates a flow diagram for one embodiment of a process 302 to select a set of link-layer interfaces in processing block 311 that satisfy a set of congestion constraint conditions. In processing block 321 process 302 begins by making the set of link-layer interfaces empty. In processing block 322 a determination is made whether there are any more available link-layer interfaces to consider. If not, the set is output in processing block 326. Otherwise in processing block 323 one of the available link-layer interfaces is picked. In processing block 324 the queue waiting for the current link-layer interface under consideration is checked to see if it is smaller than some prior predetermined threshold. Such prior predetermined thresholds may be statically or dynamically chosen. If the queue is smaller than the predetermined threshold, the current link-layer interface is added to the set of link-layer interfaces. Otherwise processing moves directly to another repetition of processing block 322. Such processing continues in like manner until all available link-layer interfaces have been considered and the set is finally output in processing block 326.

Figure 3C:
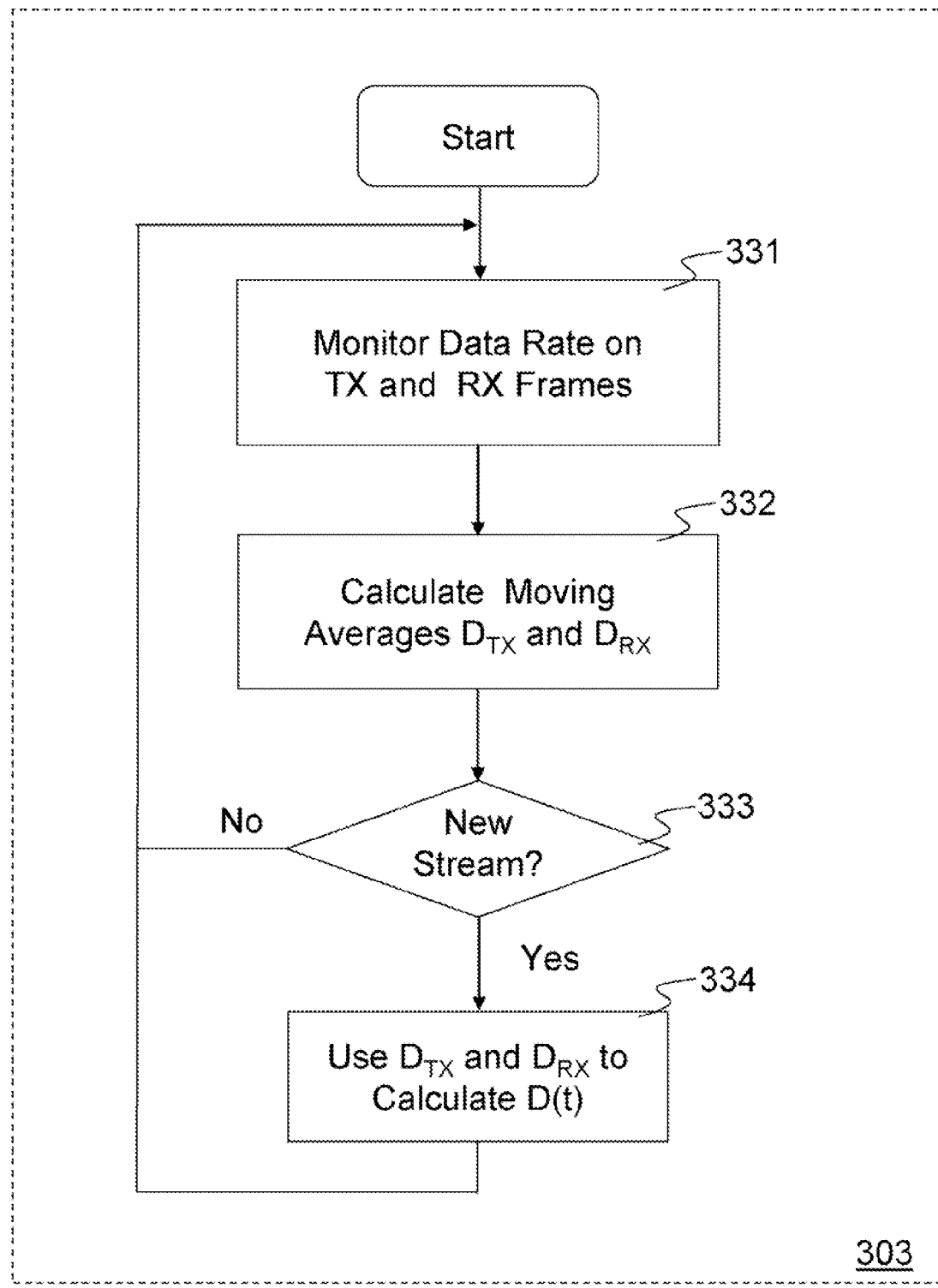
FIG. 3*c* illustrates a flow diagram for one embodiment of a process to perform a calculation of an average data transfer rate metric for a link-layer interface.

FIG. 3c illustrates a flow diagram for one embodiment of a process 303 to perform a calculation of an average data transfer rate metric in processing block 314 for a link-layer interface. In processing block 331 data rates on transmitting, TX, and receiving, RX, frames is monitored. In processing block 332 the moving averages $D_{TX}$ and $D_{RX}$ are calculated. A check is made in processing block 333 to see if a new stream is being calculated. If so the latest moving averages $D_{TX}$ and $D_{RX}$ are used to calculate a combined average data transfer rate metric, D(t) and processing resumes in processing block 331 for the new data stream. Otherwise processing repeats starting in processing block 331 for the current data stream.

Figure 3D:
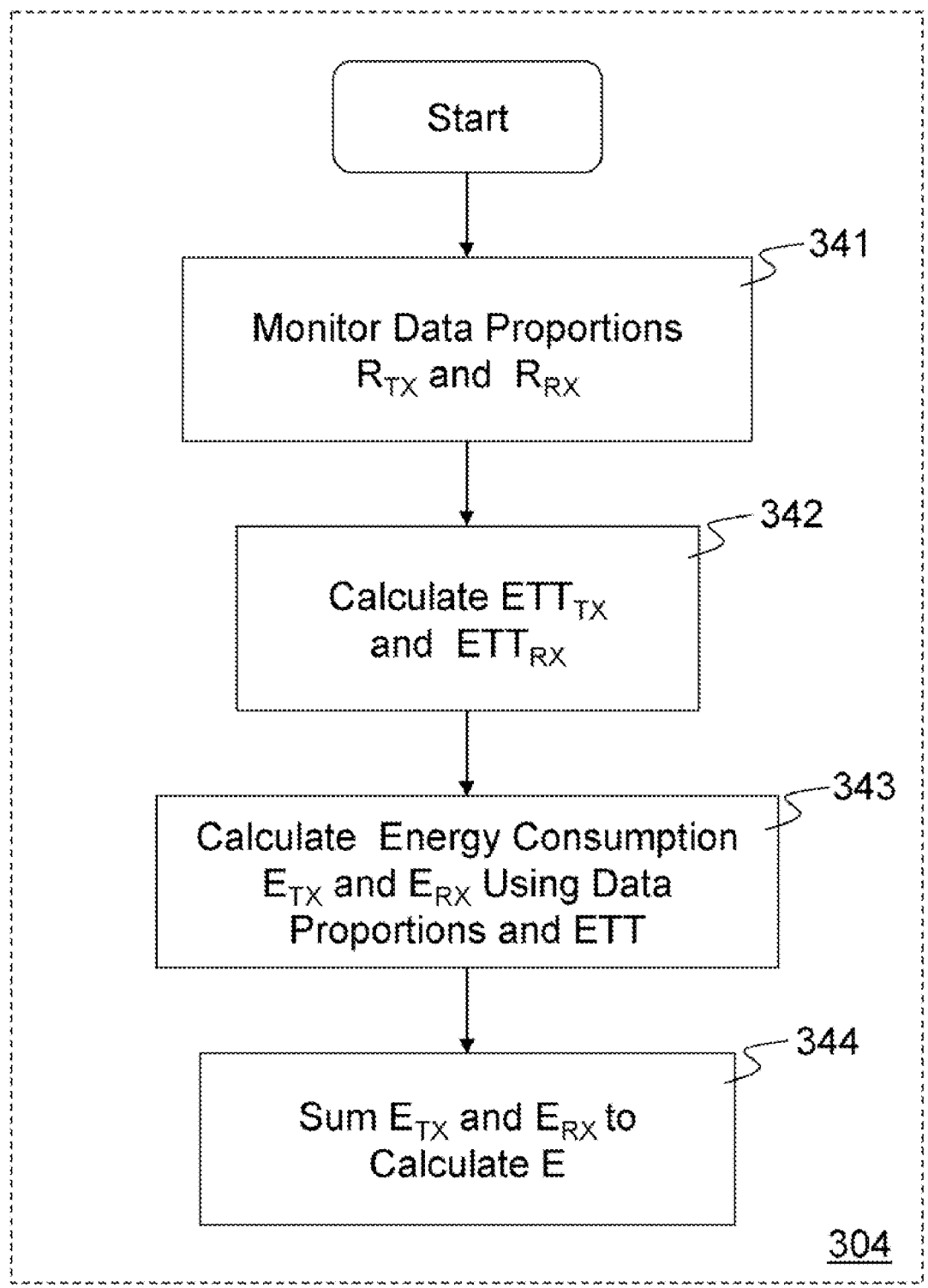
FIG. 3*d* illustrates a flow diagram for one alternative embodiment of a process to perform a calculation of an energy consumption metric for a link-layer interface.

FIG. 3d illustrates a flow diagram for one alternative embodiment of a process 304 to perform a calculation of an energy consumption metric in processing block 314 for a link-layer interface. In processing block 341 the proportion of data traffic transmitted $R_{TX}$ and the proportion of data traffic received $R_{RX}$ are monitored. In processing block 342 the expected transmission times $ETT_{TX}$ and $ETT_{RX}$ are calculated. For one embodiment the expected transmission time may be calculated as follows:

$$ETT=(O+B_t/r)(1-e_f)^{-1}$$

where O is the channel access overhead, $B_t$ is the number of bits in data frames, r is the data rate, and $e_f$ is the frame error rate. An ETT may be calculated by sending periodic test frames through the interface or by measuring existing data traffic.

In processing block 343 the energy consumptions $E_{TX}$ and $E_{RX}$ are calculated using the data traffic proportions and the expected transmission times, for example, by multiplying them together with the power consumptions for transmitting and for receiving respectively. Then in processing block 344 the energy consumptions $E_{TX}$ and $E_{RX}$ are summed together to calculation the energy consumption metric, E.

Figure 3E:
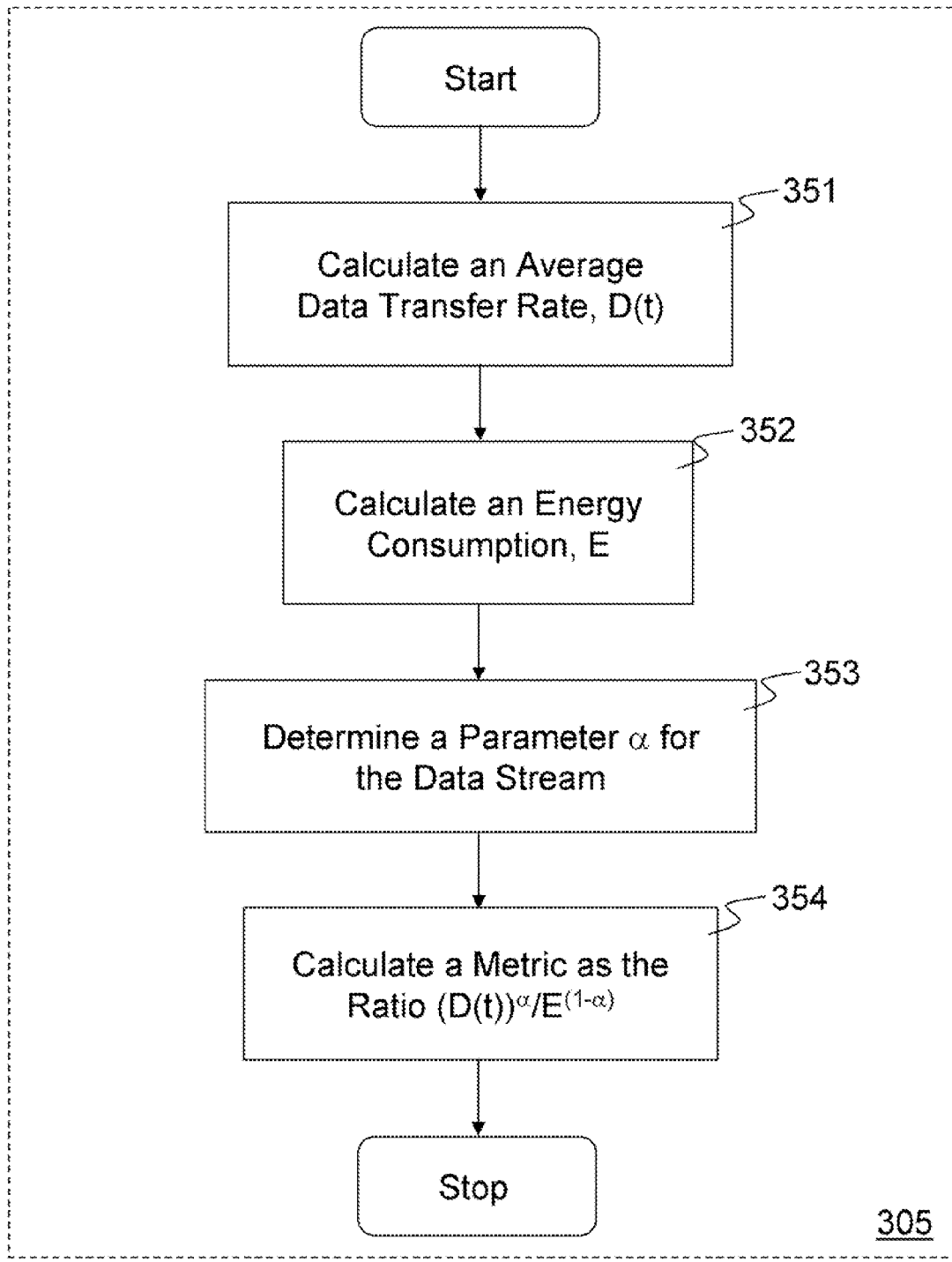
FIG. 3*e* illustrates a flow diagram for another alternative embodiment of a process to perform a calculation of a metric value for a link-layer interface.

FIG. 3e illustrates a flow diagram for another alternative embodiment of a process 305 to perform a calculation of a metric value in processing block 314 for a link-layer interface. In processing block 351 an average data rate, D(t) is calculated, for example, as in process 303. In processing block 352 an energy consumption, E, is calculated, for example, as in process 304. In processing block 353 a parameter, α, is determined for the data stream. In some embodiments the parameter, α, may be input as a value ranging between zero (0.0) and one (1.0) from policy logic 122h or policy logic 216 and can be adjusted according to needs and characteristics of the data streams. For example a value of 0.5 for the parameter, α, may be selected to balance the optimizations between energy consumption and throughput. In processing block 354, a metric value is calculated as the ratio:

$$(D(t))^{\alpha}/E^{(1-\alpha)}.$$

It will be appreciated that as changes occur in network traffic, path selection components can detect congestion in interfaces and using constrained dynamic path selection, dynamically alter the interfaces assigned to data streams on a local network based on a metric that optimizes energy consumption and/or throughput to improve communication performance.

Figure 3F:
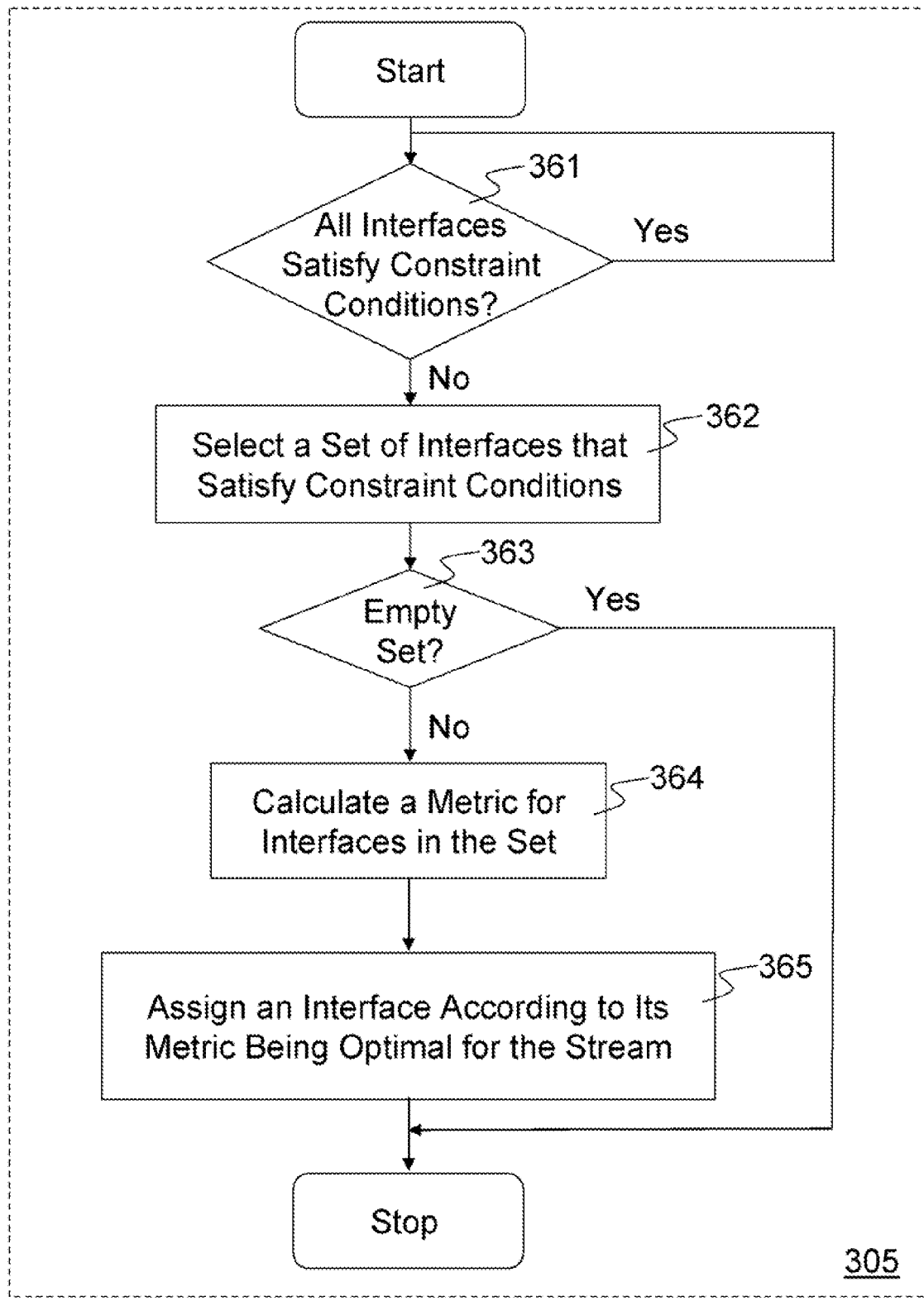
FIG. 3*f* illustrates a flow diagram for one embodiment of a process to dynamically switch constrained path selection for a data stream among multiple network communication interfaces.

FIG. 3f illustrates a flow diagram for one embodiment of a process 301 to dynamically switch a constrained path selection for a data stream among multiple network communication interfaces. In processing block 361 a check is made to see if all of the interfaces satisfy the constraint conditions? If so no switch is necessary and processing repeats in processing block 361. Otherwise, some interface does not satisfy the constraint conditions, so in processing block 362 a set of link-layer interfaces is selected that satisfy the constraint conditions. In processing block 363 the set of link-layer interfaces is checked to see if it is empty. If so, no switching is likely to improve communication performance and processing terminates from processing block 363. Otherwise processing proceeds in processing block 364 where a metric value for each link-layer interface in the set of link-layer interfaces is calculated. Then in processing block 365 a new link-layer interface in the set is assigned according to its corresponding metric value to optimize communication performance for the data stream.

It will be appreciated that embodiments of path selection components of the hybrid networking architecture may use constrained dynamic path selection to provide devices the ability to use multiple interfaces in the data-link layer simultaneously for communication with other devices on the network. Embodiments of processes that can be used by path selection components, dynamically choose interfaces for communication on the network based on a metric that optimizes energy consumption and/or throughput and can be adjusted according to characteristics of the data streams. As changes occur in network traffic, path selection components can detect congestion in interfaces and dynamically alter the interfaces assigned to data streams to improve communication performance.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method implementable by one or more machines, said method comprising:
    selecting a set of link-layer interfaces that satisfy a set of congestion constraint conditions from a plurality of link-layer interfaces;
    calculating a metric value for each link-layer interface in the set of link-layer interfaces; and
    assigning to a data stream a link-layer interface in the set of link-layer interfaces according to its corresponding metric value to optimize communication performance;
    wherein the data stream is assigned said link-layer interface in the set of link-layer interfaces according to its corresponding metric value indicating an optimal combination of data rate versus energy consumption;
    wherein the corresponding metric value is the combination of data rate, D(t), versus energy consumption, E, dynamically calculated for a particular link-layer interface using a data stream parameter, α, as $(D(t))^{\alpha}/E^{(1-\alpha)}$.

2. The method of claim 1 wherein each of the set of link-layer interfaces selected satisfies a corresponding local link-layer congestion constraint condition.

3. The method of claim 2 wherein a particular link-layer interface satisfies the corresponding local link-layer congestion constraint condition when a local queue waiting for the link-layer interface is smaller than a predetermined threshold.

4. The method of claim 1 wherein the data stream is assigned said link-layer interface in the set of link-layer interfaces according to its corresponding metric value indicating an optimal data rate.

5. The method of claim 4 wherein the corresponding metric value is a dynamically calculated average data rate for a particular link-layer interface.

6. The method of claim 1 wherein the data stream is assigned said link-layer interface in the set of link-layer interfaces according to its corresponding metric value indicating an optimal energy consumption.

7. A computer readable medium embedded with a computer executable program including instructions that, when accessed by said computer, cause the computer to implement the method of claim 1.

8. The method of claim 1 comprising:
    detecting when a first link-layer interface assigned to the data stream does not satisfy a corresponding first congestion constraint condition of the set of congestion constraint conditions;
    selecting an other set of link-layer interfaces that satisfy the set of congestion constraint conditions from the plurality of link-layer interfaces;

calculating a new metric value for each link-layer interface in the other set of link-layer interfaces; and assigning to the data stream a second link-layer interface in the other set of link-layer interfaces according to its corresponding new metric value to optimize communication performance.

9. An apparatus comprising:

selection logic operatively coupled with a plurality of link-layer interfaces to select a set of link-layer interfaces that satisfy a set of congestion constraint conditions from the plurality of link-layer interfaces;

metric logic operatively coupled with the plurality of link-layer interfaces to calculate a metric value for each link-layer interface in the set of link-layer interfaces; and switch logic operatively coupled with said selection logic and said metric logic to assign a data stream a link-layer interface in the set of link-layer interfaces according to its corresponding metric value to optimize communication performance;

wherein the data stream is assigned said link-layer interface in the set of link-layer interfaces according to its corresponding metric value indicating an optimal combination of data rate versus energy consumption;

wherein the corresponding metric value is the combination of data rate, D(t), versus energy consumption, E, dynamically calculated for a particular link-layer interface using a data stream parameter, α, as $(D(t))^{\alpha}/E^{(1-\alpha)}$.

10. The apparatus of claim 9 wherein each of the set of link-layer interfaces selected satisfy a corresponding local link-layer congestion constraint condition when a local queue waiting for each of the set of link-layer interface is smaller than a predetermined threshold.

11. The apparatus of claim 9 wherein the data stream is assigned said link-layer interface in the set of link-layer interfaces according to its corresponding metric value indicating an optimal data rate.

12. The apparatus of claim 9 wherein the data stream is assigned said link-layer interface in the set of link-layer interfaces according to its corresponding metric value indicating an optimal energy consumption.

13. The apparatus of claim 9 wherein:

said selection logic is to detect when a first link-layer interface assigned to the data stream does not satisfy a corresponding first congestion constraint condition of the set of congestion constraint conditions, and to select an other set of link-layer interfaces that satisfy the set of congestion constraint conditions from the plurality of link-layer interfaces;

said metric logic is to calculate a new metric value for each link-layer interface in the other set of link-layer interfaces; and said switch logic is to assign the data stream a second link-layer interface in the other set of link-layer interfaces according to its corresponding new metric value to optimize communication performance.

14. An article of manufacture comprising:

a computer readable medium embedded with a computer executable program including instructions that, when accessed by said computer, causes the computer to:

select a set of link-layer interfaces that satisfy a set of congestion constraint conditions from a plurality of link-layer interfaces;

calculate a metric value for each link-layer interface in the set of link-layer interfaces; and assign a data stream a link-layer interface in the set of link-layer interfaces according to its corresponding metric value to optimize communication performance;

wherein the data stream is assigned said link-layer interface in the set of link-layer interfaces according to its corresponding metric value indicating an optimal combination of data rate versus energy consumption;

wherein the corresponding metric value is the combination of data rate, D(t), versus energy consumption, E, dynamically calculated for a particular link-layer interface using a data stream parameter, α, as $(D(t))^{\alpha}/E^{(1-\alpha)}$.

15. The article of manufacture of claim 14 wherein each of the set of link-layer interfaces selected satisfy a corresponding local link-layer congestion constraint condition when a local queue waiting for each of the set of link-layer interfaces is smaller than a corresponding predetermined threshold.

16. The article of manufacture of claim 14 wherein the data stream is assigned said link-layer interface in the set of link-layer interfaces according to its corresponding metric value indicating an optimal data rate.

17. The article of manufacture of claim 14 wherein the data stream is assigned said link-layer interface in the set of link-layer interfaces according to its corresponding metric value indicating an optimal energy consumption.

18. The article of manufacture of claim 14 including data that when accessed by the machine, causes the machine to:

detect when a first link-layer interface assigned to the data stream does not satisfy a corresponding first congestion constraint condition of the set of congestion constraint conditions;

select an other set of link-layer interfaces that satisfy the set of congestion constraint conditions from the plurality of link-layer interfaces;

calculate a new metric value for each link-layer interface in the other set of link-layer interfaces; and assign to the data stream a second link-layer interface in the other set of link-layer interfaces according to its corresponding new metric value to optimize communication performance.

19. A networked system comprising:

a first network device including:

selection logic operatively coupled with a first plurality of link-layer interfaces to select a set of link-layer interfaces that satisfy a set of congestion constraint conditions from the first plurality of link-layer interfaces, metric logic operatively coupled with the first plurality of link-layer interfaces to calculate a metric value for each link-layer interface in the set of link-layer interfaces, and switch logic operatively coupled with said selection logic and said metric logic to assign a data stream a first link-layer interface in the set of link-layer interfaces according to its corresponding metric value to optimize communication performance; and a second network device including a second plurality of link-layer interfaces, one of said second plurality of link-layer interfaces operatively coupled with said first link-layer interface to facilitate a data transfer of data from said data stream between said first and second network devices over a network;

wherein the data stream is assigned said link-layer interface in the set of link-layer interfaces according to its corresponding metric value indicating an optimal combination of data rate versus energy consumption;

wherein the corresponding metric value is the combination of data rate, D(t), versus energy consumption, E, dynamically calculated for a particular link-layer interface using a data stream parameter, $\alpha$, as $(D(t))^{\alpha}/E^{(1-\alpha)}$.

20. The networked system of claim 19 wherein:

said first network device selection logic is to detect when the first link-layer interface assigned to the data stream does not satisfy a corresponding first congestion constraint condition of the set of congestion constraint conditions, and to select an other set of link-layer interfaces that satisfy the set of congestion constraint conditions from the plurality of link-layer interfaces;

said first network device metric logic is to calculate a new metric value for each link-layer interface in the other set of link-layer interfaces; and said first network device switch logic is to assign the data stream a second link-layer interface in the other set of link-layer interfaces according to its corresponding new metric value to optimize communication performance.

21. The networked system of claim 20 wherein each of the set of link-layer interfaces are selected to satisfy a corresponding local link-layer congestion constraint condition when a local queue waiting for each of the set of link-layer interface is smaller than a predetermined threshold.

22. The networked system of claim 20 wherein the data stream is assigned said second link-layer interface in the other set of link-layer interfaces according to its corresponding metric value indicating an optimal data rate.

23. The networked system of claim 19 wherein the data stream is assigned said first link-layer interface in the set of link-layer interfaces according to its corresponding metric value indicating an optimal energy consumption.

* * * * *